US012785588B2

(12) United States Patent
Kumar et al.

(10) Patent No.: US 12,785,588 B2
(45) Date of Patent: Nov. 3, 2026

(54) TEMPERATURE-BASED DISCONTINUOUS PULSE WIDTH MODULATION CONTROL SYSTEM

(71) Applicant: BorgWarner Inc., Auburn Hills, MI (US)

(72) Inventors: Ujjwal Kumar, Rochester Hills, MI (US); Siddharth Ballal, Fishers, IN (US); Caleb W. Secrest, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 192 days.

(21) Appl. No.: 18/762,564

(22) Filed: Jul. 2, 2024

(65) Prior Publication Data

US 2026/0012106 A1 Jan. 8, 2026

(51) Int. Cl.

| | |
|---|---|
| ***H02M 7/5387*** | (2007.01) |
| ***H02M 1/32*** | (2007.01) |
| ***H02M 7/49*** | (2007.01) |
| ***H02M 7/5395*** | (2006.01) |
| ***H02M 7/797*** | (2006.01) |

(52) U.S. Cl.

CPC ........... *H02M 7/5395* (2013.01); *H02M 7/49* (2013.01); *H02M 7/797* (2013.01); *H02M 1/327* (2021.05); *H02M 7/53871* (2013.01); *H02M 7/53873* (2013.01); *H02M 7/53875* (2013.01)

(58) Field of Classification Search

CPC ... H02P 27/08; H02M 1/327; H02M 7/53871; H02M 7/53873; H02M 7/53875

See application file for complete search history.

(56) References Cited

U.S. PATENT DOCUMENTS

| | | | | |
|---|---|---|---|---|
| 5,610,453 | A * | 3/1997 | Smith | H02H 6/00 307/130 |
| 5,757,636 | A * | 5/1998 | Fletcher | H02M 7/53871 363/95 |
| 7,255,476 | B2 * | 8/2007 | Franch | G01K 7/015 374/170 |
| 7,723,946 | B2 | 5/2010 | Welchko et al. | |
| 8,054,032 | B2 | 11/2011 | Chakrabarti et al. | |
| 8,487,575 | B2 * | 7/2013 | Yeh | H02P 29/664 318/432 |
| 9,559,630 | B2 | 1/2017 | Marohl et al. | |

(Continued)

FOREIGN PATENT DOCUMENTS

| | | |
|---|---|---|
| CN | 104410311 A | 3/2015 |
| WO | WO2013182781 A1 | 12/2013 |

OTHER PUBLICATIONS

Hava, Ahmet M., et al.; Simple Analytical and Graphical Methods for Carrier-Based PWM-VSI Drives; IEEE Transactions on Power Electronics, vol. 14, No. 1; dated Jan. 1999 (13 pages).

(Continued)

*Primary Examiner* — Gary A Nash

(74) *Attorney, Agent, or Firm* — Reising Ethington P.C.

(57) ABSTRACT

An inverter controller configured to control an inverter includes a microprocessor that is configured to measure or estimate a temperature of a first phase and to measure or estimate a temperature of a second phase; determine whether the temperature of the first phase is greater than the second phase; and select a switch in the inverter to clamp based on the determination.

16 Claims, 10 Drawing Sheets

(56) References Cited

U.S. PATENT DOCUMENTS

| | | | | |
|---|---|---|---|---|
| 9,584,043 | B2 * | 2/2017 | Zhang | H02M 7/5395 |
| 2010/0188135 | A1 * | 7/2010 | Keronen | H02M 7/493<br>327/482 |
| 2014/0070739 | A1 * | 3/2014 | Luedtke | B60L 50/13<br>318/400.02 |
| 2014/0306638 | A1 * | 10/2014 | Wu | H02P 21/22<br>318/504 |
| 2016/0373047 | A1 * | 12/2016 | Loken | H02M 7/53875 |
| 2021/0063467 | A1 * | 3/2021 | Kazmirski | G01R 31/007 |

OTHER PUBLICATIONS

Krah, Jens-Onno, et al.; High-Performance Current Regulation and Efficient PWM Implementation for Low-Inductance Servo Motors; IEEE Transactions on Industry Application, vol. 35, No. 5; dated Sep.-Oct. 1999; (11 pages).

Cougo, Bernardo, et al.; Influence of PWM Methods on Semiconductor Losses and Thermal Cycling of 15-kVA Three-Phase SiC Inverter for Aircraft Applications; dated Apr. 7, 2020 (18 pages).

Stella, Fausto, et al.; Mitigation of the Performance Derating in SiC Motor Drive Inverters Operating at Low Output Current Frequency; IEEE Energy Conversion Congress and Exposition; dated 2023 (8 pages).

Khan, Hamid; Optimized Space Vector Modulation for Variable Speed Drives; Universite Blaise Pascal—Clermont II; dated Nov. 6, 2012; (167 pages).

Khan, Hamid, et al.; Random Discontinuous Space Vector Modulation for Variable Speed Drives; IEEE; dated Mar. 1, 2012; (6 pages).

Khan, Hamid, et al.; Discontinuous Random Space Vector Modulation for Electric Drives: A Digital Approach; IEEE Transactions on Power Electronics, vol. 27, No. 12; dated Dec. 2012; (8 pages).

Anuchin, Alecksey, et al.; Minimization and Redistribution of Switching Losses Using Predictive PWM Strategy in a Voltage Source Inverter; IEEE; dated Jan. 31, 2018; (6 pages).

EP Extended Search Report for EP Application No. 25182211.0, dated Nov. 7, 2025, (11 pages).

* cited by examiner

330

Table I. Voltage Switching Vectors

| Voltage Vectors | Switching Vectors | | |
|---|---|---|---|
| | A | B | C |
| $V_0$ | 0 | 0 | 0 |
| $V_1$ | 1 | 0 | 0 |
| $V_2$ | 1 | 1 | 0 |
| $V_3$ | 0 | 1 | 0 |
| $V_4$ | 0 | 1 | 1 |
| $V_5$ | 0 | 0 | 1 |
| $V_6$ | 1 | 0 | 1 |
| $V_7$ | 1 | 1 | 1 |

$$D_2 = MI(2\sqrt{3}/\pi)\sin(\theta_V - i\pi/3) \quad \text{Equation (1)}$$

$$D_1 = MI(3/\pi)\cos(\theta_V - i\pi/3) - D_2/2 \quad \text{Equation (2)}$$

$$D_0 = 1 - D_1 - D_2 \quad \text{Equation (3)}$$

In Equations (1)-(3), i is the sector number of the SV-PWM hexagon and $MI = |Vref|\pi/(2V\,dc)$

| Hexagon Sector | Phase Clamp Selection |
|---|---|
| Sector - I [Case 0] | AU Clamped ; $\max(T_{AU}, T_{AL}) > \max(T_{CU}, T_{CL})$<br>CL Clamped ; $\max(T_{CU}, T_{CL}) > \max(T_{AU}, T_{AL})$<br>No Change ; $\max(T_{AU}, T_{AL}) = \max(T_{CU}, T_{CL})$ |
| Sector - II [Case 1] | BU Clamped ; $\max(T_{BU}, T_{BL}) > \max(T_{CU}, T_{CL})$<br>CL Clamped ; $\max(T_{CU}, T_{CL}) > \max(T_{BU}, T_{BL})$<br>No Change ; $\max(T_{BU}, T_{BL}) = \max(T_{CU}, T_{CL})$ |
| Sector - III [Case 2] | BU Clamped ; $\max(T_{BU}, T_{BL}) > \max(T_{AU}, T_{AL})$<br>AL Clamped ; $\max(T_{AU}, T_{AL}) > \max(T_{BU}, T_{BL})$<br>No Change ; $\max(T_{AU}, T_{AL}) = \max(T_{BU}, T_{BL})$ |
| Sector - IV [Case 3] | CU Clamped ; $\max(T_{CU}, T_{CL}) > \max(T_{AU}, T_{AL})$<br>AL Clamped ; $\max(T_{AU}, T_{AL}) > \max(T_{CU}, T_{CL})$<br>No Change ; $\max(T_{AU}, T_{AL}) = \max(T_{CU}, T_{CL})$ |
| Sector - V [Case 4] | CU Clamped ; $\max(T_{CU}, T_{CL}) > \max(T_{BU}, T_{BL})$<br>BL Clamped ; $\max(T_{BU}, T_{BL}) > \max(T_{CU}, T_{CL})$<br>No Change ; $\max(T_{BU}, T_{BL}) = \max(T_{CU}, T_{CL})$ |
| Sector - VI [Case 5] | AU Clamped ; $\max(T_{AU}, T_{AL}) > \max(T_{BU}, T_{BL})$<br>BL Clamped ; $\max(T_{BU}, T_{BL}) > \max(T_{AU}, T_{AL})$<br>No Change ; $\max(T_{AU}, T_{AL}) = \max(T_{BU}, T_{BL})$ |

Fig-9

Table III. Continuous-Carrier DPWM Duty Cycle Calculation

| Switch (Hexagon Sector) | PWM Alignment Mode | Duty Cycle X |
|---|---|---|
| Case 0: | Center | "Duty Cycle C" = 0.0;<br>"Duty Cycle B" = "$D_2$";<br>"Duty Cycle A" = "Duty Cycle B" + "$D_1$"; |
| | Inverse Center | "Duty Cycle A" = 1.0;<br>"Duty Cycle B" = 1.0 - "$D_1$";<br>"Duty Cycle C" = "Duty Cycle B" - "$D_2$"; |
| | Inverse Edge OR Edge | "Duty Cycle C" = 0.5 * "$D_0$";<br>"Duty Cycle B" = "Duty Cycle C" + "$D_2$";<br>"Duty Cycle A" = "Duty Cycle B" + "$D_1$"; |
| Case 1: | Center | "Duty Cycle C" = 0.0;<br>"Duty Cycle A" = "$D_1$";<br>"Duty Cycle B" = "Duty Cycle A" + "$D_2$"; |
| | Inverse Center | "Duty Cycle B" = 1.0;<br>"Duty Cycle A" = 1.0 - "$D_2$";<br>"Duty Cycle C" = "Duty Cycle A" - "$D_1$"; |
| | Inverse Edge OR Edge | "Duty Cycle C" = 0.5 * "$D_0$";<br>"Duty Cycle A" = "Duty Cycle C" + "$D_1$";<br>"Duty Cycle B" = "Duty Cycle A" + "$D_2$"; |
| Case 2: | Center | "Duty Cycle A" = 0.0;<br>"Duty Cycle C" = "$D_2$";<br>"Duty Cycle B" = "Duty Cycle C" + "$D_1$"; |
| | Inverse Center | "Duty Cycle B" = 1.0;<br>"Duty Cycle C" = 1.0 - "$D_1$";<br>"Duty Cycle A" = "Duty Cycle C" - "$D_2$"; |
| | Inverse Edge OR Edge | "Duty Cycle A" = 0.5 * "$D_0$";<br>"Duty Cycle C" = "Duty Cycle A" + "$D_2$";<br>"Duty Cycle B" = "Duty Cycle C" + "$D_1$"; |

Fig-12A

Table III. Continuous-Carrier DPWM Duty Cycle Calculation, continued

| Switch (Hexagon Sector) | PWM Alignment Mode | Duty Cycle X |
|---|---|---|
| Case 3: | Center | "Duty Cycle A" = 0.0;<br>"Duty Cycle B" = "$D_1$";<br>"Duty Cycle C" = "Duty Cycle B" + "$D_2$"; |
| | Inverse Center | "Duty Cycle C" = 1.0;<br>"Duty Cycle B" = 1.0 - "$D_2$";<br>"Duty Cycle A" = "Duty Cycle B" - "$D_1$"; |
| | Inverse Edge OR Edge | "Duty Cycle A" = 0.5 * "$D_0$";<br>"Duty Cycle B" = "Duty Cycle A" + "$D_1$";<br>"Duty Cycle C" = "Duty Cycle B" + "$D_2$"; |
| Case 4: | Center | "Duty Cycle B" = 0.0;<br>"Duty Cycle A" = "$D_2$";<br>"Duty Cycle C" = "Duty Cycle A" + "$D_1$"; |
| | Inverse Center | "Duty Cycle C" = 1.0;<br>"Duty Cycle A" = 1.0 - "$D_1$";<br>"Duty Cycle B" = "Duty Cycle A" - "$D_2$"; |
| | Inverse Edge OR Edge | "Duty Cycle B" = 0.5 * "$D_0$";<br>"Duty Cycle A" = "Duty Cycle B" + "$D_2$";<br>"Duty Cycle C" = "Duty Cycle A" + "$D_1$"; |
| Case 5: | Center | "Duty Cycle B" = 0.0;<br>"Duty Cycle C" = "$D_1$";<br>"Duty Cycle A" = "Duty Cycle C" + "$D_2$"; |
| | Inverse Center | "Duty Cycle A" = 1.0;<br>"Duty Cycle C" = 1.0 - "$D_2$";<br>"Duty Cycle B" = "Duty Cycle C" - "$D_1$"; |
| | Inverse Edge OR Edge | "Duty Cycle B" = 0.5 * "$D_0$";<br>"Duty Cycle C" = "Duty Cycle B" + "$D_1$";<br>"Duty Cycle A" = "Duty Cycle C" + "$D_2$"; |

Fig-12B

Table IV. Continuous PWM (CPWM) Duty Cycle Calculation

| Switch (Hexagon Sector) | Action |
|---|---|
| 0 | "Duty Cycle C" = 0.5 * "$D_0$";<br>"Duty Cycle B" = "Duty Cycle C" + "$D_2$";<br>"Duty Cycle A" = "Duty Cycle B" + "$D_1$"; |
| 1 | "Duty Cycle C" = 0.5 * "$D_0$";<br>"Duty Cycle A" = "Duty Cycle C" + "$D_1$";<br>"Duty Cycle B" = "Duty Cycle A" + "$D_2$"; |
| 2 | "Duty Cycle A" = 0.5 * "$D_0$";<br>"Duty Cycle C" = "Duty Cycle A" + "$D_2$";<br>"Duty Cycle B" = "Duty Cycle C" + "$D_1$"; |
| 3 | "Duty Cycle A" = 0.5 * "$D_0$";<br>"Duty Cycle B" = "Duty Cycle A" + "$D_1$";<br>"Duty Cycle C" = "Duty Cycle B" + "$D_2$"; |
| 4 | "Duty Cycle B" = 0.5 * "$D_0$";<br>"Duty Cycle A" = "Duty Cycle B" + "$D_2$";<br>"Duty Cycle C" = "Duty Cycle A" + "$D_1$"; |
| 5 | "Duty Cycle B" = 0.5 * "$D_0$";<br>"Duty Cycle C" = "Duty Cycle B" + "$D_1$";<br>"Duty Cycle A" = "Duty Cycle C" + "$D_2$"; |

Fig-12C

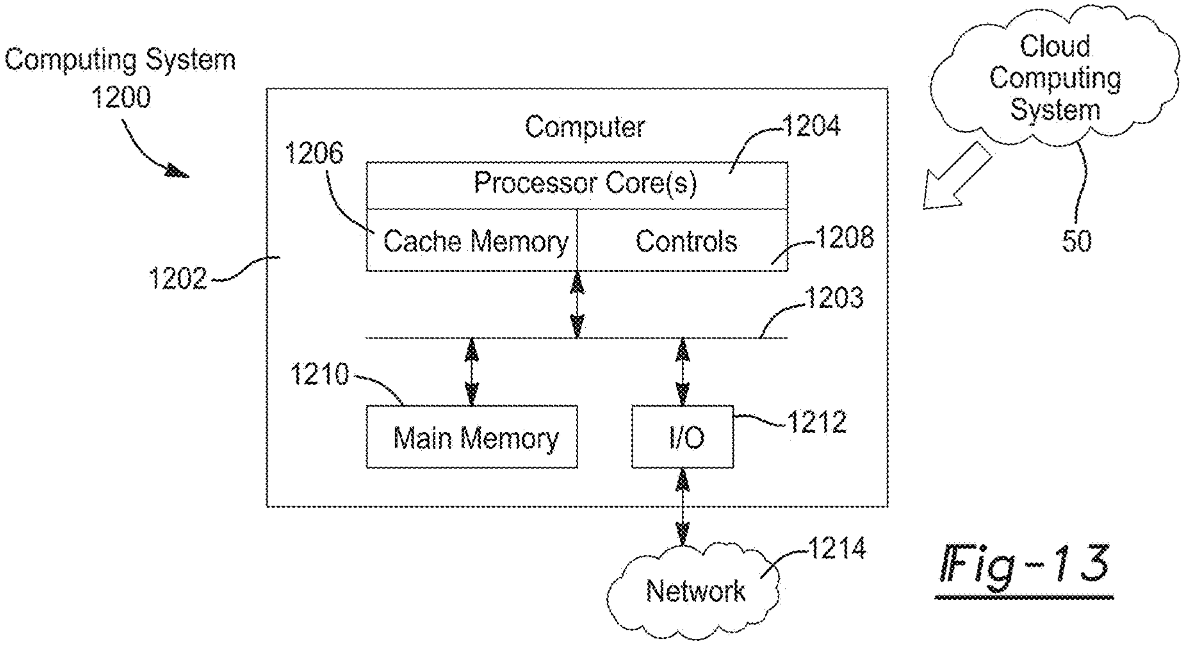

Fig-13

TEMPERATURE-BASED DISCONTINUOUS PULSE WIDTH MODULATION CONTROL SYSTEM

TECHNICAL FIELD

The present application relates to control systems for rotating electrical machines and, more particularly, to temperature-based discontinuous pulse width modulation control systems for rotating electrical machines.

BACKGROUND

Modern vehicles often use an electric motor drive system at least partially for propulsion. The electric motor drive system can include a battery, an electric motor, and an inverter for inverting direct current (DC) electrical power stored in the battery into alternating current output for the electric motor. An inverter controller can be coupled to the inverter to regulate the inversion of DC electrical power into AC current. There are various different control schemes that can be used to control the switches included in the inverter.

SUMMARY

In one implementation, an inverter controller configured to control an inverter includes a microprocessor that is configured to measure or estimate a temperature of a first phase and to measure or estimate a temperature of a second phase; determine whether the temperature of the first phase is greater than the second phase; and select a switch in the inverter to clamp based on the determination.

In another implementation, an inverter controller configured to control an inverter includes a microprocessor that is configured to select one of six hexagon sectors for discontinuous pulse width modulation; measure or estimate a temperature of a first phase and to measure or estimate a temperature of a second phase; determine whether the temperature of the first phase is greater than the second phase; and select a switch in the inverter to clamp based on whether the temperature of the first phase is greater than the second phase, and the selected sector.

In yet another implementation, a method of controlling an inverter, includes the steps of: measuring or estimating a temperature of a first phase; measuring or estimating a temperature of a second phase; determining whether the temperature of the first phase is greater than the second phase; and selecting a switch in the inverter to clamp based on the determination.

BRIEF DESCRIPTION OF THE DRAWINGS

FIG. 9 is a table depicting how a portion of the method shown in FIG. 5 can be implemented in accordance with embodiments of the disclosure;

FIG. 12A is a first portion of a table illustrating how a portion of the computer-implemented methodology show in FIG. 5 can be implemented in accordance with embodiments of the disclosure;

FIG. 12B is a second portion of the table shown in FIG. 11A illustrating how a portion of the computer-implemented methodology show in FIG. 5 can be implemented in accordance with embodiments of the disclosure;

FIG. 12C is a first portion of a table illustrating how SV-PWM can be implemented; and FIG. 13 is a simplified block diagram illustrating a computer system operable to implement embodiments of the disclosure.

DETAILED DESCRIPTION

A system and method to monitor the temperature of a plurality of switches used to implement an inverter and driven by discontinuous pulse width modulation (PWM) that involves clamping a phase leg electrically coupled to the inverter based on temperature of the switches to reduce switching loss in the switch(es) with the highest thermal stress. Carrying out the temperature-based discontinuous PWM control method can reduce switching losses thereby improving performance.

Figure 1:
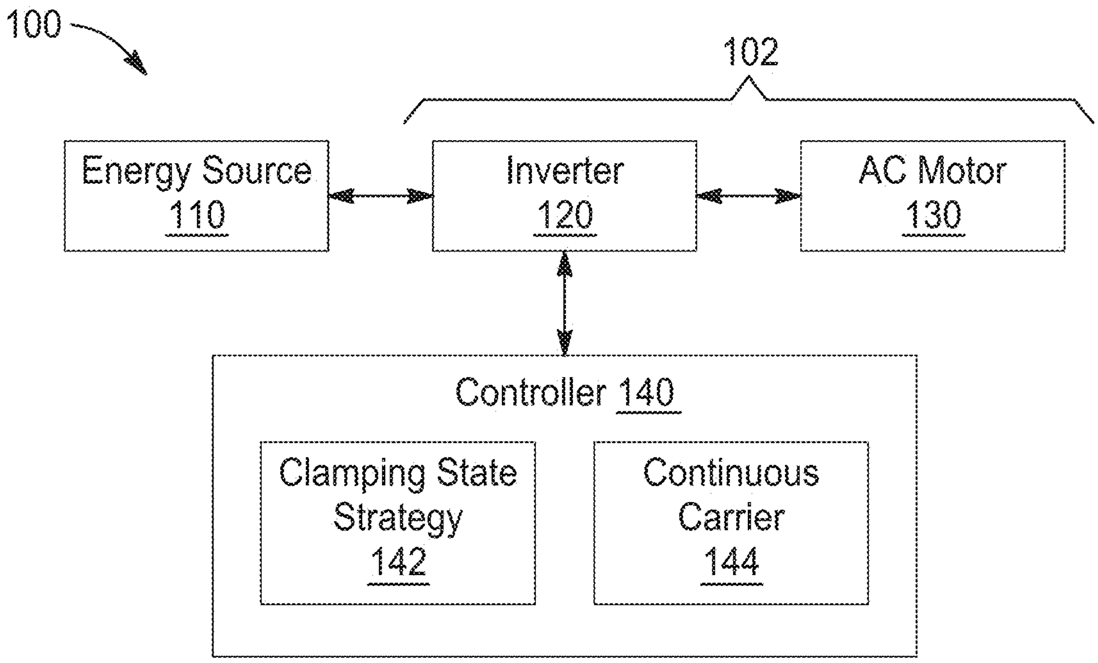
FIG. 1 is a block diagram illustrating an implementation of an electric drive motor system in accordance with aspects of the disclosure.

Turning to FIG. 1, an implementation of an electric motor drive system includes an electric motor operable to receive and use the AC; a multi-level three-phase inverter operable to receive direct current (DC) from an energy source and generate the AC as a three phase AC waveform; and an inverter controller operable to control, in a novel manner, how the three phase AC waveform is generated at the necessary frequency and amplitude. A system 100 includes an energy source 110 electrically coupled to an electric motor drive system 102. In the embodiment depicted in FIG. 1, the electric motor drive system 102 includes an inverter 120, an AC motor 130, and an inverter controller 140. The inverter controller 140 further includes a clamping state strategy module 142 and a continuous carrier module 144. Although the inverter 120, the AC motor 130, and the inverter controller 140 are depicted as separate components, it is understood that the inverter 120, the AC motor 130, and the inverter controller 140 can be combined in any suitable combination. For example, the inverter controller 140 can be incorporated within the inverter 120; the inverter 120 can be incorporated within the AC motor 130; and/or the inverter 120 and the inverter controller 140 can be incorporated within the AC motor 130.

The energy source 110 can be implemented in a variety of forms, including, for example as a battery. In some embodiments, the battery can be a battery pack having a set of one or more individual battery cells connected in series or in parallel and that operate under the control of one or more controllers, such as a battery control module (BCM) that monitors and controls the performance of the battery pack. The BCM can monitor several battery pack level characteristics such as pack current measured by a current sensor, pack voltage, and pack temperature, for example. The battery pack can be recharged by an external power source (not shown). The battery pack can include power conversion electronics operable to condition the power from the external power source to provide the proper voltage and current levels to the battery pack. The individual battery cells within a battery pack can be constructed from a variety of chemical formulations. Battery pack chemistries can include, but are not limited, to lead acid, nickel cadmium (NiCd), nickel-metal hydride (NIMH), lithium-ion or lithium-ion polymer.

The AC motor 130 can be any electric motor design that is suitable for at least partially propelling a vehicle. Vehicles can include battery electric vehicles and hybrid electric vehicles but are not limited to automobiles. Regardless of the type of the AC motor 130, it relies on electromagnetism and moving magnetic fields to generate mechanical power. A conventional implementation of the AC motor 130 can include four basic parts, namely, a stator; a rotor; a solid axle and coils. The winding of the stator in an AC motor is a ring of electromagnets that are paired up and energized in sequence, which creates the rotating magnetic field. An induction motor often uses a so-called squirrel cage. The squirrel cage in an AC motor is a set of rotor bars connected to two rings, one at either end. The squirrel cage rotor goes inside the stator. When AC power is sent through the stator, it creates an electromagnetic field. The bars in the squirrel cage rotor are conductors, so they respond to the motion of the stator's poles, which rotates the rotor and creates its own magnetic field. Some AC motors use a wound rotor, which is wrapped with wire instead of being a squirrel cage. For a permanent magnetic motor, magnets are mounted on the surface of the rotor core or inserted into the rotor core to produce magnetic fields.

Figure 2:
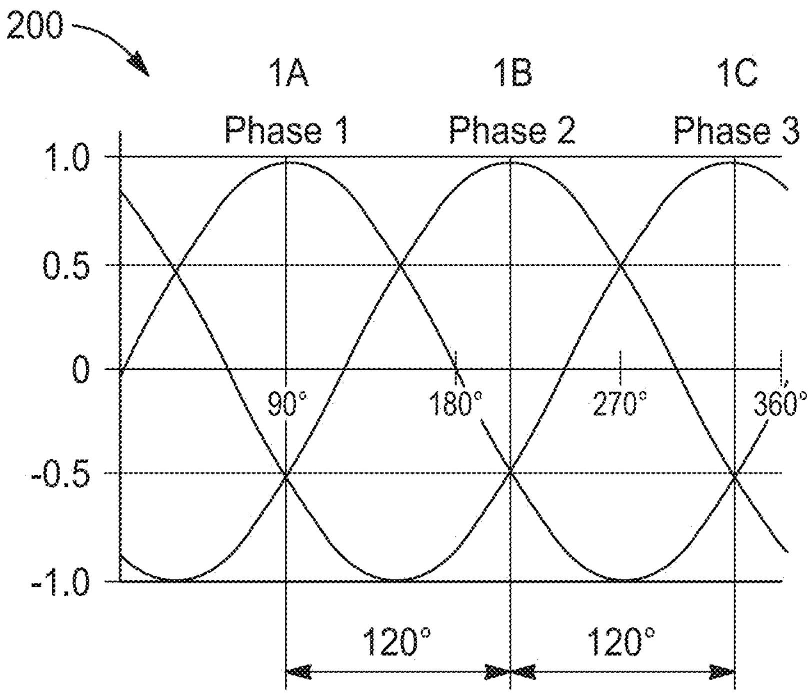
FIG. 2 is a plot illustrating an implementation of a three-phase AC output waveform that can be generated using embodiments of the disclosure.

The inverter 120 is electrically coupled between the energy source 110 and the AC motor 130 to transfer energy from the energy source 110 to the AC motor 130. In embodiments of the disclosure, the inverter 120 is operable to convert the DC voltage received from the energy source 110 to a three-phase AC current as required by the AC motor 130 to function. In embodiments of the disclosure, the inverter 120 can be a three-phase full-bridge inverter having six switches organized as three "phase legs." Each phase leg can include two switches connected in series and between a positive DC rail and a negative DC rail. At any given moment, up to three of the inverter switches conduct while the other three inverter switches are open. A phase node can be positioned between the two switches of each phase leg to provide the three phases of a three-phase AC waveform output. An example three phase AC waveform 200 is depicted in FIG. 2. An individual conductor can be coupled to each of the phase nodes to carry AC of the same frequency and voltage amplitude relative to a common reference but with a phase difference of one third of a cycle (i.e., 120 degrees out of phase) between each, as shown in FIG. 2. Due to the phase difference, the voltage on any conductor reaches its peak at one third of a cycle after one of the other conductors and one third of a cycle before the remaining conductor. This phase delay gives constant power transfer to a balanced linear load.

The inverter controller 140 can control the three phase AC waveform having a frequency and amplitude. The inverter controller 140 can include a clamping state strategy module 142 and a continuous carrier module 144 in accordance with aspects of the disclosure. The clamping strategy state module 142 can select a clamping state (positive or negative clamping) and a to-be-clamped phase-leg from among the three inverter phase legs according to a clamping state selection strategy. The clamping state selection strategy implemented by the module 142 is applied for each sector of the SV hexagonal star 600 (shown in FIG. 6), which calls for a corresponding selection of a carrier waveform that is matched to the selected clamping state. In some embodiments of the disclosure, the clamping state selection strategy is based on a comparison between temperature of the candidate phase legs. Based on an observation that the inverter switching losses are directly related to temperature, the novel clamping state selection strategy clamps the phase with the highest temperature to minimize switching losses and maximize efficiency. The inverter controller 140 can be implemented using one or more microprocessors or micro-controllers that can receive data signals having values indicating temperature of switches as well as executing computer-readable instructions to control the conductivity of the switches as part of carrying out inverter functionality.

The inverter controller 140 can also estimate the temperature of the switches based on the physical and environmental conditions of the switches. The losses in the semiconductor devices in the three-phase inverter can be related to conduction and switching loss. The conduction loss may be a derived from the electrical current flowing through the switch and the switch characteristics whereas, the switching loss is dependent on the switching frequency of the inverter, phase current, DC link voltage, and the switching characteristics. The estimated power loss can then be fed to a thermal model which estimates a device junction temperature based on the loss and environmental conditions, such as coolant temperature or ambient temperature. The estimated temperature can be a software-executed model-based temperature for the switch and can be used as a substitute for the junction temperature in the absence of physical measured temperature signals.

A typical three-phase full-bridge inverter can include six switching elements (e.g., transistors) organized as three "phase legs," with each phase leg including two switching elements connected in series and between a positive DC rail and a negative DC rail. At any given moment, up to three of the inverter switching elements can conduct while the other three inverter switching elements can be open or non-conductive. A phase node can be positioned between the two switching elements of each phase leg to provide the three phases of a three phase AC waveform output. An example three phase AC waveform 200 is depicted in FIG. 2. An individual conductor can be coupled between each phase node and one of three motor terminals to carry the three-phase AC waveform 200 to the motor. Each phase of the three-phase AC waveform 200 can have the same frequency and voltage amplitude relative to a common reference but with a phase difference of one third of a cycle (i.e., 120 degrees out of phase) between each. Due to the phase difference, the voltage on any conductor reaches its peak at one third of a cycle after one of the other conductors and one third of a cycle before the remaining conductor. In general, a carrier-based PWM scheme can compare a reference (or control) signal to a carrier (or modulation) signal in each phase leg of the inverter. Every time these two signals (reference/carrier) cross, the associated inverter switching element can be turned on or off. The carrier signal may be either a saw-tooth or a triangular signal with the desired switching frequency. In a conventional implementation, one triangular carrier signal can be used to modulate all three phase legs in a three-phase voltage source inverter because its symmetrical switching sequence results in lower power losses and lower total harmonic distortion (THD).

Discontinuous PWM (DPWM) is a type of PWM in which the duty cycle or each phase can be clamped to the DC-rail for one-third of each period. DPWM can reduce switching losses because, in DPWM, only two (2) switches may be turned on and off over one switching period compared to, for example, three (3) switches being turned on and off over one switching period when using, for example, continuous PWM (CPWM).

For the previously-described reference signal, there are many alternatives. For example, a modulation technique known as space vector PWM (SV-PWM) can be used to generate the reference signal. SV-PWM is a modulation scheme used to control the inverter switching elements in a manner that applies a given voltage vector to a three-phased electric motor (e.g., permanent magnet or induction machine). With the six (6) switching elements in a conventional inverter, there are eight discrete voltage vectors that can be applied instantaneously. Of these eight vectors, there are only six non-zero vectors with all six producing different voltage angles. For high-performance motor control, a smoothly rotating voltage vector is desired rather than one that skips sixty (60) degrees per step. SV-PWM schemes control the inverter switching elements in a manner that emulates a smoothly rotating voltage vector to rotate the motor. SV-PWM techniques generate pulse width modulated signals to control the switching elements of the inverter in a manner that generates and combines voltage vectors to form the three phases of the three-phase AC waveform output (e.g., the three-phase AC waveform 200 shown in FIG. 2).

Figure 3:
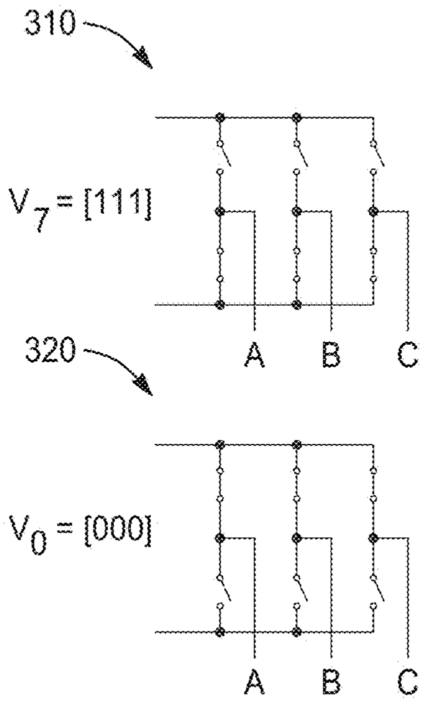
FIG. 3 is a block diagram and a table illustrating aspects of the disclosure.
Figures 6, 7:
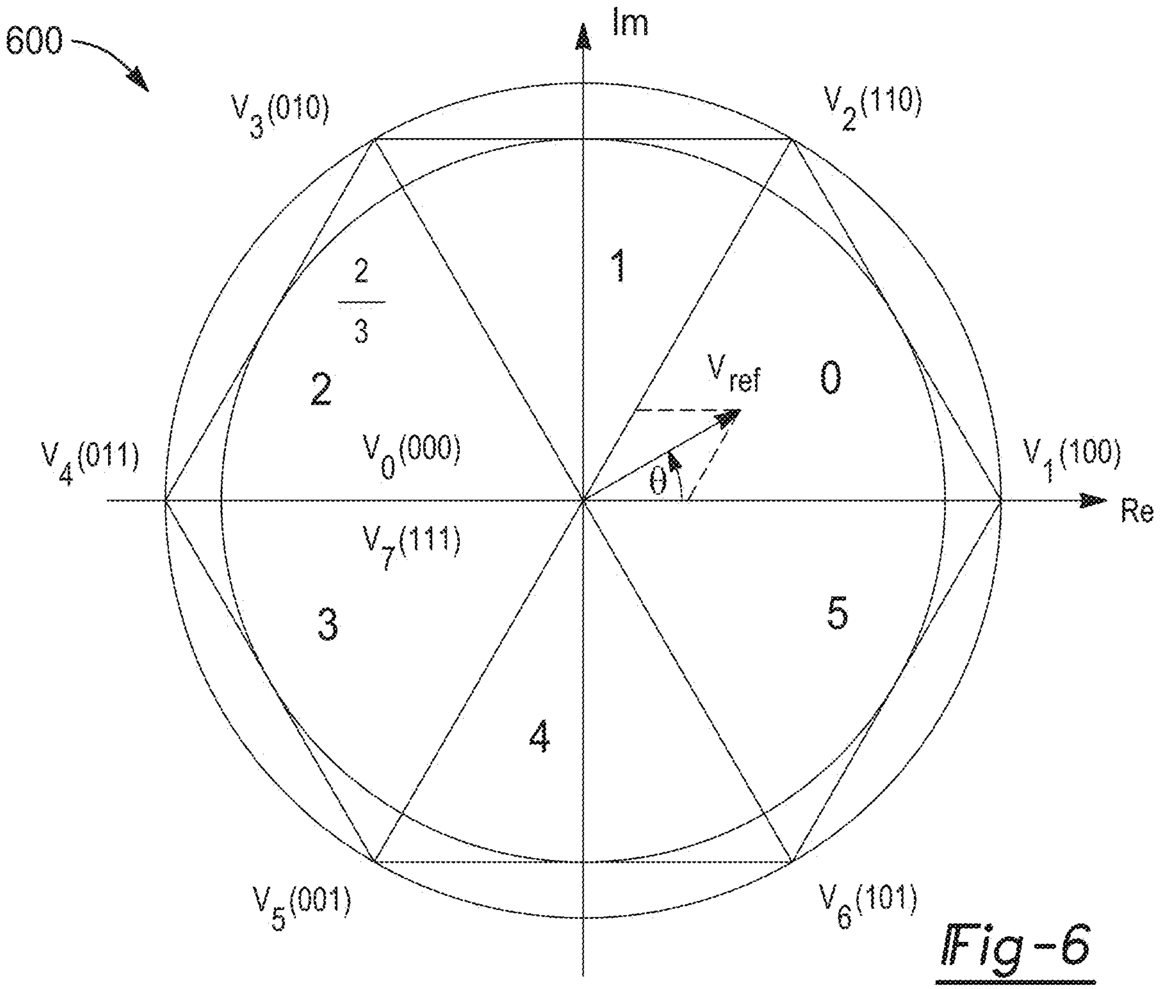
FIG. 6 is a hexagonal star diagram illustrating a space vector pulse width modulation (SV-PWM) technique that can be used in performing portions of the method shown in FIG. 5.
FIG. 7 depicts equations that can be used in performing portions of the computer-implemented methodology shown in FIG. 5.

In SV-PWM, to avoid short-circuiting the inverter input capacitor and energy source 110 (e.g., capacitor 442 shown in FIG. 4) both switching elements in one phase leg may not be conducting simultaneously. Thus, each output from the three (3) inverter phase nodes (shown as “A,” “B,” and “C” in FIG. 3) can be in one of two phase node states. In one phase node state, the upper inverter switching element is closed (conducting), the lower inverter switching element is open (non-conducting), and this closed/open state is represented as a “one” (1) phase node state. In another phase node state, the upper inverter switching element is open (non-conducting), the lower inverter switching element is closed (conducting), and this open/closed state is represented as a zero (0) phase node state. As shown by the Table I 330 in FIG. 3, eight ($2^3$) total phase node states are available for the output (e.g., $V_0$-$V_7$ shown in FIG. 3). These phase node states are referred to as base vectors. The eight base vectors can be plotted on a hexagonal star diagram, an example of which is the hexagonal star diagram 600 depicted in FIG. 6. As shown in FIG. 6, each vector (e.g., $V_0$-$V_7$ shown in FIGS. 3 and 6) makes up a spoke of the hexagonal star, with sixty (60) degrees phase difference between adjacent vectors. The two vectors ($V_0$ and $V_7$) that contain outputs that are either all plus (e.g., $V_7$=(1 1 1) shown at inverter 310 shown in FIG. 3) or all minus (e.g., $V_0$=(0 0 0) shown at inverter 320 shown in FIG. 3) are referred to as null vectors and are plotted at the center (origin) of the hexagonal star. The goal of SV-PWM is to produce a “mean vector” during the PWM period. The PWM period means how long one $V_{ref}$ or $V_{out}$ is applied in a digital signal processor. It is usually equal to a current sampling period and the period of the carrier waveform. The location of $V_{ref}$ is determined on the star diagram, and the base vectors that constrain that sector ($V_1$ and $V_2$, for example), along with one of the null vectors ($V_0$ or $V_7$), are used to synthesize the desired voltage. This is done by applying $V_1$ for a specified time ($T_1$), $V_2$ for a specified time ($T_2$), and the null vector a specified time ($T_0$) to provide a resultant vector equal to $V_{ref}$ or $V_{out}$. The magnitude and frequency of the inverter output voltage can be calculated if the DC voltage into the inverter, the reference (or control) signal, and the carrier (or modulation) signal waveforms are known.

Figure 4:
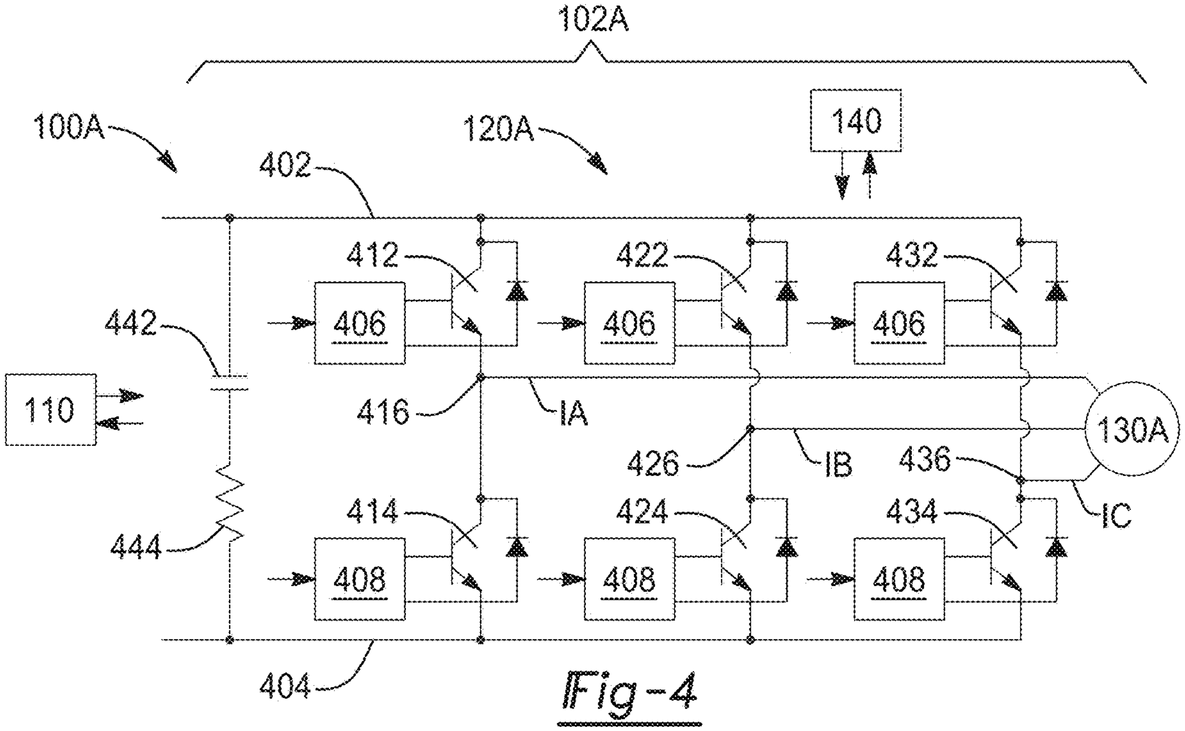
FIG. 4 is a block diagram illustrating an implementation of an inverter of the electric motor drive system shown in FIG. 1.

FIG. 4 depicts a system 100A having the energy source 110 electrically coupled to an electric motor drive system 102A. The system 100A is a non-limiting example implementation of the system 100 (shown in FIG. 1), and the electric motor drive system 102A is a non-limiting example implementation of the electric motor drive system 102 (shown in FIG. 1). The electric motor drive system 102A can be implemented as a voltage source inverter (VSI) 120A electronically coupled to the inverter controller 140 and an electric machine 130A. The electric machine 130A is an example implementation of the AC motor 130 (shown in FIG. 1). Although the VSI 120A, the electric machine 130A, and the inverter controller 140 are depicted as separate components, it is understood that the VSI 120A, the electric machine 130A, and the inverter controller 140 can be configured and arranged in any suitable combination of components. For example, the inverter controller 140 can be incorporated within the VSI 120A; the VSI 120A can be incorporated within the electric machine 130A; and/or the VSI 120A and the inverter controller 140 can be incorporated within the electric machine 130A.

The VSI 120A is electrically connected to a DC bus, which is formed from a positive DC rail 402 and a negative DC rail 404. The VSI 120A is also electrically connected to the electric machine 130A, which can be a multi-phase AC electric motor/generator. The inverter controller 140 can be implemented as a variety of types of computing devices, which include a computer, a microprocessor, a digital signal processor, and the like, configured and operable to execute software commands and programs, and which can include associated firmware, such that the controller is configured and operable to control how the VSI 120A generates three-phase AC waveform (e.g., the three-phase AC waveform 200 shown in FIG. 2). In some embodiments of the disclosure, the inverter controller 140 can also be configured and arranged to include the features and functionality of the computing system 1200 (shown in FIG. 12). The electric machine 140 can be a permanent magnet synchronous device, an induction machine or the like. The VSI 120A electrically connects to the energy source 110 via a positive high voltage DC power bus (HV+) (i.e., a positive DC rail) 402 and a negative high-voltage DC power bus (HV−) (i.e., a negative DC rail) 404. The energy source 110 can be implemented in a variety of forms, including, for example, a high-voltage DC power source such as a high voltage battery or a capacitor; a high-voltage electric power generator; and/or another related device or system.

The VSI 120A can include a bus capacitor 442 and a resister 444 operable to provide noise suppression, load balancing, and the like. The VSI 120A includes a plurality of switches 412, 414, 422, 424, 432, 434 organized in switch pairs that include an upper switch (e.g., upper switch 412) in series with a lower switch (e.g., lower switch 414) and separated by a phase node (e.g., first phase node 416). More specifically, upper switch 412 and lower switch 414 are electrically connected at a first phase node 416 and in series with one another between HV+ 402 and HV− 404; upper switch 422 and lower switch 424 are electrically connected at a second phase node 426 and in series with one another between HV+ 402 and HV− 404; and upper switch 432 and lower switch 434 are electrically connected at third phase node 436 and in series with one another between HV+ 402 and HV− 404. Each of the upper/lower switch pairs 412 and 414, 422 and 424, and 432 and 434 defines a phase leg of the VSI 120A and corresponds to a phase of the electric machine 130A. The nodes 416, 426 and 436 electrically connect to nominal first, second and third phases of the electric machine 130A to transfer electric power thereto. The switches 412, 414, 422, 424, 432, 434 can be implemented using MOSFETs, MOSFET modules, or IGBTs to provide some examples. The MOSFETs can include four terminals: a source terminal, a gate terminal, a drain terminal, and a sensor terminal that can output temperature values. The gate terminal and the sensor terminal can be coupled to the controller 140 such that the controller 140 can render the switches conductive/non-conductive and also receive temperature data provided by each switch indicating the temperature of each switch.

The upper switches 412, 422, 432 are referred to as high-side switches, and the lower switches 414, 424, 434 are referred to as low-side switches. A first, high-side gate drive circuit 406 controls activation and deactivation of the first, high-side switches 412, 422 and 432, and a second, low-side gate drive circuit 408 controls activation and deactivation of the second, low-side switches 414, 424 and 434. The gate drive for 412, 422, and 432 may each operate independently; the gate drive for 414, 424, and 434 may be independent as well. The first, high-side gate drive circuit 406 and the second, low-side gate drive circuit 408 include any suitable electronic device capable of activating and deactivating the upper/lower switches 412 and 414, 422 and 424, and 432 and 434 to cause power transfer between one of HV+ 402 and HV− 404 and a phase of the electric machine 130A in response to control signals originating at the inverter controller 140. The inverter controller 140 generates control signals that are communicated to the first, high-side gate drive circuit 406 and the second, low-side gate drive circuit 408 to activate and deactivate the upper/lower switches 412 and 414, 422 and 424, and 432 and 434 in response to an inverter switch control mode.

Each of the upper, high-side switches 412, 422 and 432 and the lower, low-side switches 414, 424 and 434 can be controlled (e.g., through command signals from the controller 140 applied to the drive circuits 406, 408) to either an ON state or an OFF state. Each of the phase legs formed by the upper/lower switch pairs 412 and 414, 422 and 424, and 432 and 434 can be controlled to a control state of one (1) or zero (0). A control state of one (1) for one of the phase legs corresponds to activation of one of the upper, high-side switches 412, 422 and 432 with a corresponding lower, low-side switch 414, 424 or 434, respectively, deactivated (e.g., as shown at 310 in FIG. 3). A control state of zero (0) for one of the phase legs corresponds to activation of one of the lower, low-side switches 414, 424 and 434 with corresponding upper, high-side switch 412, 422 or 432, respectively, deactivated (e.g., as shown at 320 of FIG. 3). Each of the upper, high-side switches 412, 422 and 432 is preferably configured as a normally-OFF switch, meaning that the switch conducts electrical current only when activated by the first, high-side gate drive 406. In one example, the upper, high-side switches 412, 422 and 432 are insulated gate bipolar transistors (IGBTs) or MOSFETs each having a diode arranged in parallel. The first, high-side gate drive 406 activates each of the upper, high-side switches 412, 422 and 432 to cause current flow thereacross responsive to the selected inverter switch control mode. Each of the lower, low-side switches 414, 424 and 434 is typically configured as a normally-OFF switch, meaning that the switch conducts electrical current only when activated by the second, low-side gate drive 408. The lower, low-side switches 414, 424 and 434 can be any suitable normally-OFF semiconductor switch, including, e.g., IGBT switches each having a diode arranged in parallel. During operation, the first, high-side gate drive circuit 406 and the second, low-side gate drive circuit 408 generate activation signals to activate and deactivate the upper, high-side switches 412, 422 and 432 and the lower, low-side switches 414, 424 and 434 to operate the electric machine 130A to generate torque. The VSI 120A electrically operatively connects to the electric machine 130A in that the action of selectively activating and deactivating the upper/lower switches 412 and 414, 422 and 424, and 432 and 434 to cause power transfer between one of HV+ 402 and HV− 404 and a phase of the multi-phase electric machine 130A in response to control signals originating at the inverter controller 120A induces a magnetic field in an element of a stator of the electric machine 130A that acts on an element of the rotor to urge movement of the rotor within the stator, thus inducing torque in a shaft member mechanically coupled to the rotor.

The inverter controller 120A monitors signal inputs from sensors (not shown separately from the electric machine 130A), such as a rotational position sensor and voltage and/or current sensors, and selectively controls operation of the VSI 120A to perform a novel carrier-based SV-DPWM scheme in accordance with aspects of the disclosure. The novel carrier-based SV-DPWM includes performing the functionality associated with the clamping state strategy module 142 and the continuous carrier module 144. Additional details of how the clamping state strategy module 142 and the continuous carrier module 144 can be implemented in accordance with embodiments of the disclosure are depicted in FIGS. 5-12 and described in greater detail below.

Figure 5:
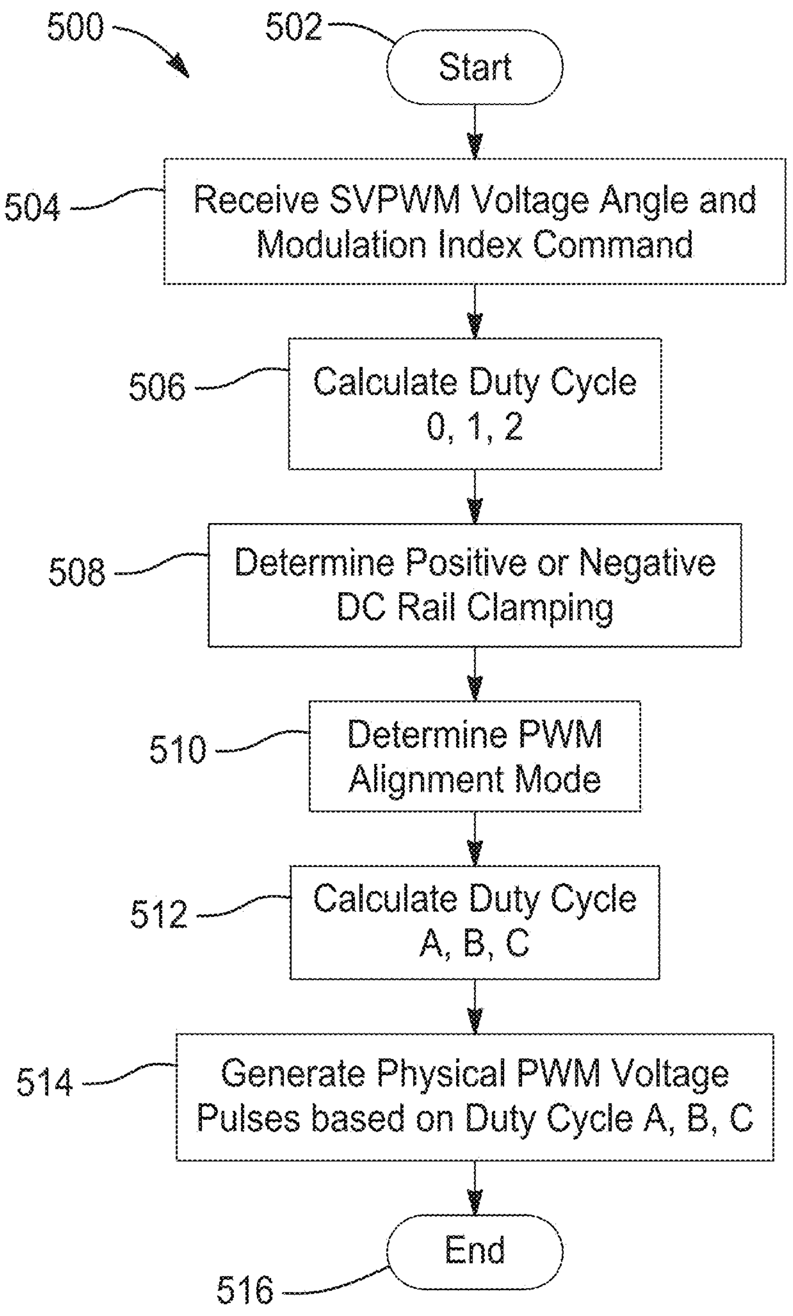
FIG. 5 is a flow chart of an implementation of a method of using an inverter controller of the electric motor drive system shown in FIGS. 1 and 4 in accordance with embodiments of the disclosure.

FIG. 5 is a flow diagram illustrating a method 500 that can be carried out by the inverter controller 120, 120A (shown in FIGS. 1 and 4) of the electric motor drive system 102, 102A (shown in FIGS. 1 and 4). The method 500 can involve a carrier-based SV-DPWM scheme and may at least partially be performed by the clamping state strategy module 142 and the continuous carrier module 144. The method 500 involves clamping a phase leg based on a determined thermal stress of switches included in the inverter 120, 120*a*. The method 500 begins at block 502, and then moves to block 504 where the inverter controller 140 receives the SV-PWM voltage angle and the modulation index command. In general, the voltage angle can be the phase of the voltage, and the modulation index (or modulation depth) of a modulation scheme indicates by how much the modulated variable of the carrier signal varies around its unmodulated level.

At block 506, the method 500 uses the values received or accessed at block 504 (where MI is the modulation index; and Ov is the SV-PWM voltage angle) and Equations (1)-(3) shown in FIG. 7 to compute the duty cycles $D_0$, $D_1$, $D_2$. Referring to the SV-PWM hexagonal star diagram 600 depicted in FIG. 6, traditional SV-PWM operates in the stationary reference frame on a 3-phase 2-level VSI (e.g., VSI 120A shown in FIG. 4)). When implementing traditional SV-PWM, a control voltage vector, $V_{ref}$ can rotate within the SV-PWM hexagon star diagram 600. The vectors from the center of the SV-PWM hexagon star diagram 600 to each vertex of the SV-PWM hexagon star diagram 600 represent the magnitude and phase of the stationary frame voltage applied for all possible active switching states of the inverter (labeled $V_1$ through $V_6$). The center of the SV-PWM hexagon star diagram 600 represents a zero-voltage output of the inverter (e.g., VSI 120A shown in FIG. 4) and is achieved when all three phases are tied to the lower DC voltage rail 404 (shown in FIG. 4) (i.e., $V_0$=(000) shown at 320 in FIG. 3) or all three phases are tied to the upper DC voltage rail 402 (shown in FIG. 4) (i.e., $V_7$=(111) shown at 310 in FIG. 3). These states are labeled $V_0$ and $V_7$ in FIG. 6, respectively. By projecting $V_{ref}$ onto the two adjacent switch state vectors V1, V2 as shown in FIG. 6, the ratio of time spent in the adjacent switching states with respect to the duration of the entire PWM period are the duty cycles $D_0$, $D_1$, $D_2$ and can be determined using Equations (1)-(3) shown in FIG. 7.

At block 508, the method 500 determines the phase leg of the inverter (e.g., inverter 120A shown in FIG. 4) that will be clamped for the DPWM, and further determines whether the selected to-be-clamped phase leg will be clamped to the positive DC rail (e.g., positive DC rail 402 shown in FIG. 4) or the negative DC rail (e.g., the negative DC rail 404 shown in FIG. 4). In embodiments of the disclosure, the operations at block 508 correspond to operations performed by the clamping state strategy module 142 (shown in FIG. 1). Traditional CPWM applies the $D_0$, $D_1$ and $D_2$ duty cycles calculated using Equations (1)-(3) (shown in FIG. 7) to each phase such that all three (3) inverter phases undergo switching state changes when operating using CPWM. Also, when operating using CPWM, both zero voltage states ($V_0$, $V_7$) can be used each PWM period. In accordance with aspects of the disclosure, to reduce switching losses from CPWM, one of the phases can be clamped to either the positive DC rail (e.g., DC rail 402 shown in FIG. 4) or the negative DC rail (e.g., DC rail 404 shown in FIG. 4) of the inverter (e.g., VSI 120A) for the entire PWM period. In this case, only two (2) of the three (3) phases (i.e., A, B, or C shown at Table I 330 in FIG. 3) may be switched, and only one (1) of the zero vectors (i.e., $V_0$ or $V_7$) may be used per PWM period. Within each hexagon sector I-VI (or related cases 0, 1, 2, 3, 4, 5 shown in FIG. 9), there is one (1) phase that must be switched. For example, in the hexagon sector zero (0), because the adjacent hexagon vertices are $V_1$ (100) and $V_2$ (110), phase B must be switched. This leaves an option to either clamp phase A to the positive DC voltage rail for the entire PWM period (and subsequently utilize $V_7$ as the zero-vector state) or clamp phase C to the negative DC voltage rail for the entire PWM period (and subsequently utilize $V_0$ as the zero-vector state).

Figure 8:
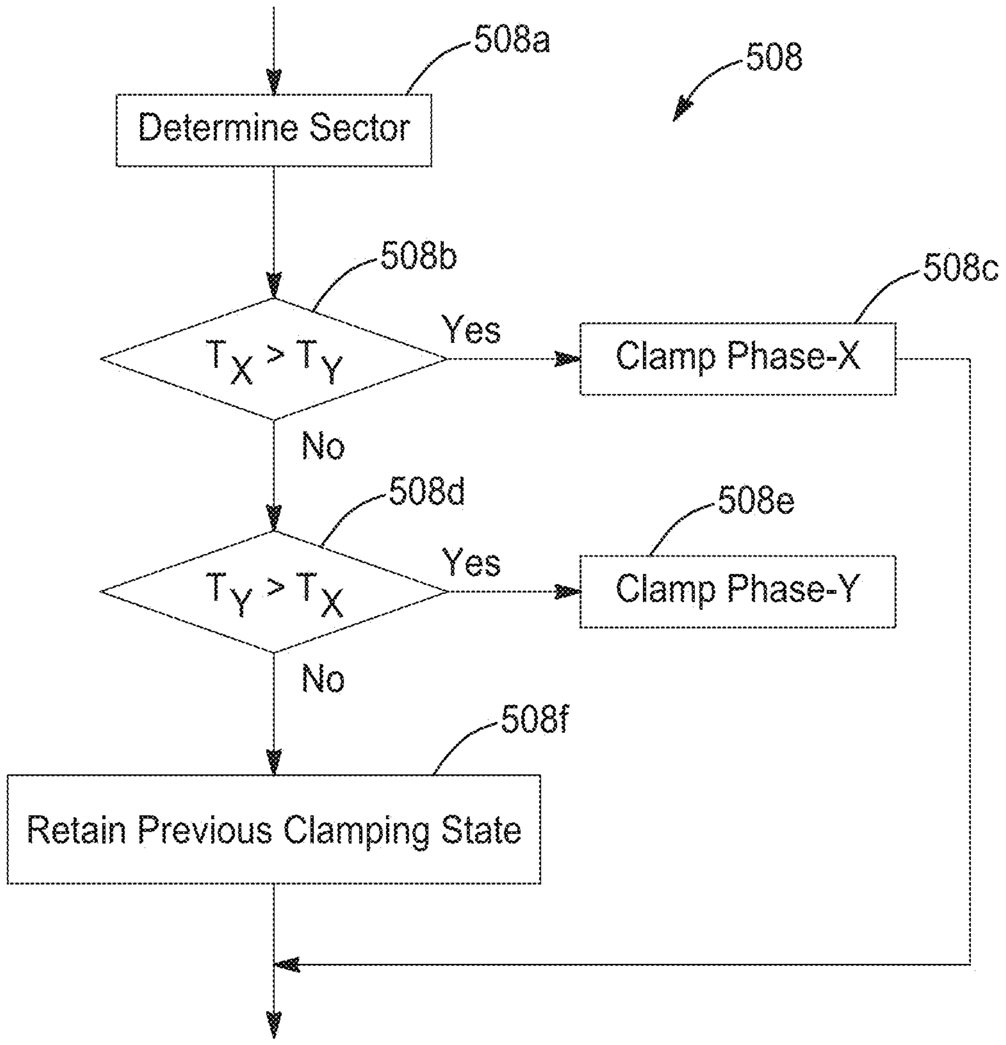
FIG. 8 is a flow chart depicting how a portion of the method shown in FIG. 5 can be implemented in accordance with embodiments of the disclosure.

Determining the phase leg of the inverter to clamp for DPWM involves measuring the temperature of the switches included in the inverter 102*a* and clamping a phase based on the determined temperature. An implementation of block 508 is shown in FIG. 8. Block 508 can include a subroutine beginning at step 508*a* where a sector is selected. With reference to FIG. 6, one of six sectors (case 0-5; Sector I-VI) in the SV-PWM hexagon star diagram 600 are selected. The sector can be selected based on the equations and variables shown in FIG. 7. Once one of the six sectors in the SV-PWM hexagon star diagram 600 is chosen, the subroutine proceeds to step 508*b* where the controller 140 can determine whether temperature X ($T_x$) is greater than temperature Y ($T_y$). The variables X and Y can be associated with a phase A, B, or C depending on the chosen sector in the SV-PWM hexagon star diagram 600. The variables X and Y can be mapped to two phases selected from phase, A, B, and C and stored in non-volatile memory accessible by the controller 140. A table is shown in FIG. 9 depicting an implementation of such mapping. For example, for Sector I/Case 0, X represents phase A and Y represents phase C. And for Sector II/Case 1, X represents phase B and Y represents phase C. For Sector III/Case 2, X represents phase B and Y represents phase A. Sector IV/Case 3 associates phase C with X and phase A with Y. Sector V/Case 4 associates phase C with X and phase B with Y. And Sector VI/Case 5 associates phase A with X and phase B with Y.

Figure 10:
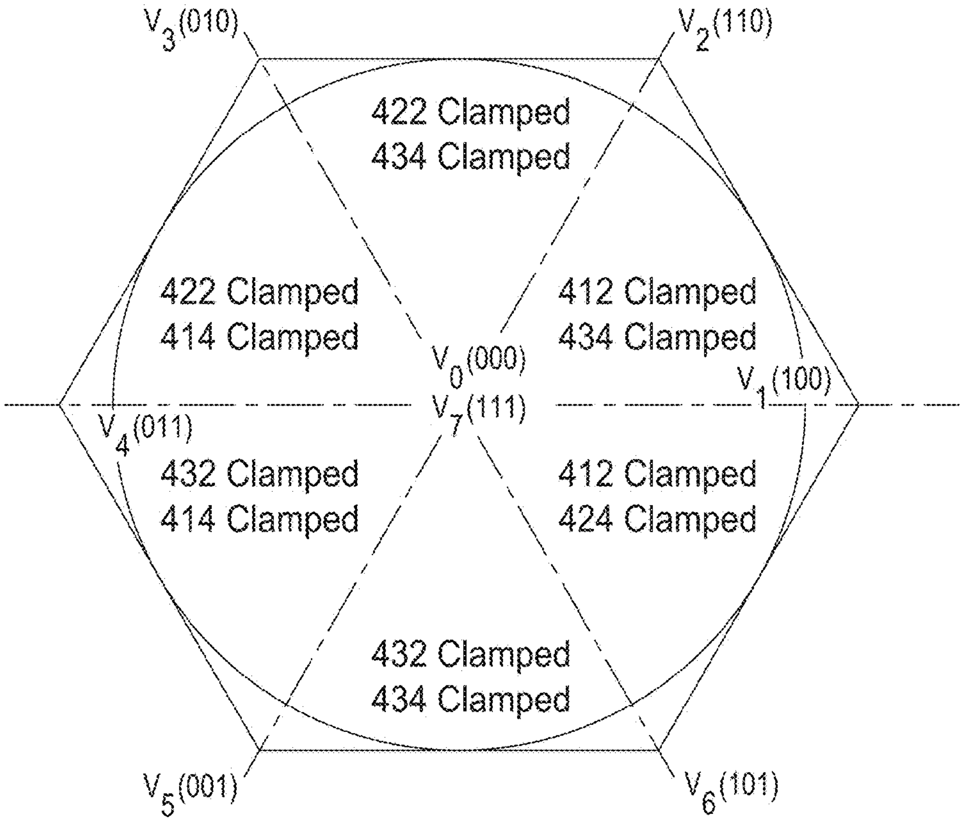
FIG. 10 is a hexagonal star diagram illustrating phase clamping selections that can be used in performing portions of the method shown in FIG. 5.

If the temperature of the switches associated with the Phase represented by X ($T_x$) is greater than the temperature of the switches associated with the phase represented by Y ($T_y$), then the controller 140 can clamp the phase represented by X at step 508*c*. For example, assuming that the controller 140 selected Sector I/Case 0 at step 508*a*, the controller 140 can associate X with phase A and Y with phase C. The controller 140 can then measure the temperature of upper and lower switches 412, 414 (phase A; X; $T_{AU}$, $T_{AL}$) and 432, 434 (phase C; Y; $T_{CU}$, $T_{CL}$). If the measured temperature of switches 412, 414 is greater than the measured temperature of switches 432, 434, then the controller 140 can clamp the upper switch of phase A 412 as shown by the phase clamp selection column of FIG. 9. A hexagon in FIG. 10 depicts switch clamping choices having the upper value in Sector 1/Case 0 shown as 412 clamped. Otherwise, the process proceeds to step 508*d*.

At step 508*d*, the controller 140 can determine if the temperature of the switches associated with the phase represented by Y ($T_y$) is greater than the temperature of the switches associated with the Phase represented by X ($T_x$), then the controller 140 can clamp the phase represented by Y at step 508*e*. Using the example above, assuming that the controller 140 selected Sector I at step 508*a*, the controller 140 can measure the temperature of switches 412, 414 (phase A; X; $T_{AU}$, $T_{AL}$) and 432, 434 (phase C; Y; $T_{CU}$, $T_{CL}$). If the measured temperature of switches 412, 414 is less than the measured temperature of switches 432, 434, then the controller 140 can clamp the lower switch of phase C 434 as shown by the phase clamp selection column of FIG. 9. If the temperatures are equal, or substantially equal such that the measured temperatures are within a predefined threshold, the previous clamping state can be maintained at step 508*f*, and the method 500 can proceed to block 510. FIGS. 9 and 10 depict the remaining sectors II-IV/cases 1-5, the switches involved, and the chosen switches to clamp.

At block 510, the methodology 500 uses the clamping state selection determined at block 508 to determine the PWM alignment mode (PWM-AM). In embodiments of the disclosure, the PWM-AM refers to the carrier waveform that will be used to perform a novel "continuous carrier" implementation of carrier-based DPWM. As previously noted, carrier-based PWM is a modulation scheme that provides low harmonic distortion characteristics and simple implementation by comparing a reference (or control) signal to a carrier (or modulation) signal in each phase leg of the inverter. Every time these two signals (reference/carrier) cross, the associated inverter switching element is turned on or off. The carrier signal is typically either a saw tooth or a triangular signal with the desired switching frequency. In conventional carrier-based PWM implementations, one triangular carrier signal is used to modulate all three phase legs in a three-phase VSI because its symmetrical switching sequence results in lower power losses and lower THD.

However, for embodiments of the disclosure where the novel clamping state determination performed at block 508 results in a change to the clamping state, a non-clamped intermediate duty cycle carrier is inserted to prevent discontinuities in the carrier waveform used in the PWM scheme. When inserting a non-clamped intermediate duty cycle carrier to prevent undesirable PWM pulses, specific PWM carrier alignment modes are manipulated based on the clamping status. These alignment modes are depicted in FIG. 10, and the alignment determination strategy can be implemented using the methodology 900 shown in FIG. 9. In embodiments of the disclosure, the methodology 900 can be performed by the continuous carrier module 144 shown in FIG. 1.

Figure 11:
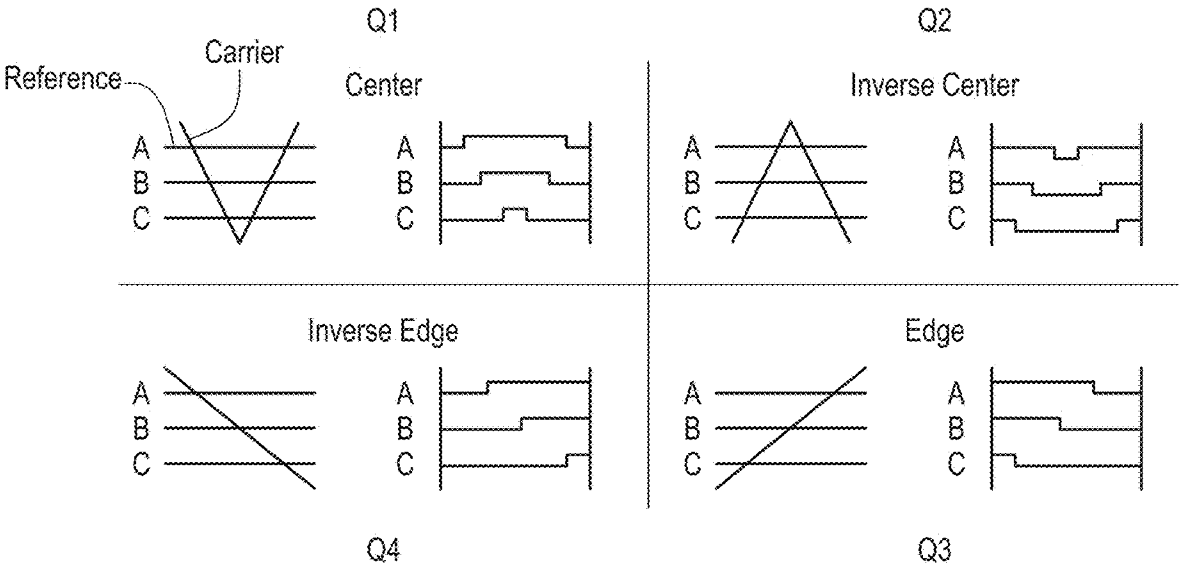
FIG. 11 is a set of simplified diagrams illustrating PWM alignment mode options used to implement the PWM alignment mode selection methodology shown in FIG. 9 in accordance with embodiments of the disclosure.

The PWM-AMs utilized in aspects of the disclosure will now be described with reference to FIG. 11. FIG. 11 is organized in four (4) quadrants, identified as Q1, Q2, Q3, and Q4. Each quadrant Q1, Q2, Q3, Q4 depicts a leftmost diagram and a rightmost diagram. The leftmost diagram plots the movement of the Reference signal (i.e., Duty Cycles) and the Carrier signal for each phase A, B, C over time (i.e., over the duration of the given PWM period); and the rightmost diagram plots the corresponding on/off state for each phase A, B, C over time (i.e., over the duration of the given PWM period). The diagrams depicted in FIG. 11 provide examples of the carrier waveforms and what would be the corresponding on/off state when random duty cycles are provided. In the leftmost diagram, when the Reference is higher than the Carrier, the corresponding phase is on (conducting), and when the Reference is lower than the Carrier, the corresponding phase is off (non-conducting). This relationship defines the duty cycle of the given phase and is reflected by the duty cycle(s) shown in the rightmost diagram. In Q1, the PWM-AM is identified as a "Center" PWM-AM. In Q2, the PWM-AM is identified as an "Inverse Center" PWM-AM. In Q3, the PWM-AM is an intermediate duty cycle carrier identified as an "Edge" PWM-AM. In Q4, the PWM-AM is an intermediate duty cycle carrier identified as an "Inverse Edge" PWM-AM. A phase leg clamped to a positive DC rail can require a different carrier waveform than if that same phase leg or another phase leg is clamped to the negative DC rail. If the carrier waveform change is too abrupt (e.g., bringing the carrier waveform from a high (or topmost) location to a low (or bottommost) location in less than a predetermined period of time required by the associated hardware), the physical switching elements may not be able to execute such a change. Accordingly, block 510 selectively inserts, where needed, a selected type of non-clamped intermediate duty cycle carrier (Edge, Inverse Edge) between a given carrier waveform transition to avoid abrupt changes that cannot be executed by the switching elements, thereby ensuring that any changes to the carrier waveform occur in a continuous manner that can be executed by the switching elements.

Using the clamping state selection determined at block 508, at block 510, the continuous carrier module 144 (shown in FIG. 1) of the inverter controller 140 (shown in FIG. 1) determines the ending location of the carrier waveform from the prior PWM period, and further determines the desired ending location of the carrier waveform for the current PWM period. If the prior PWM period's carrier waveform ends in a high (or topmost) location (e.g., the "Center" carrier waveform shown in FIG. 11), and if the desired ending location for the current PWM period's carrier waveform is a high (or topmost) location (e.g., the "Center" carrier shown in FIG. 11), no non-clamped intermediate duty cycle carrier is inserted. Similarly, if the prior PWM period's carrier ends in a low (or bottommost) location (e.g., the "Inverse Center" carrier shown in FIG. 11), and if the desired ending location of the current PWM period's carrier waveform is a low (or bottommost) location (e.g., the "Inverse Center" carrier shown in FIG. 11), no intermediate duty cycle carrier is inserted. However, if the prior PWM period's carrier ends in a high (or topmost) location (e.g., the "Center" carrier shown in FIG. 11), and if the desired ending location of the current PWM period's carrier waveform is a low (or bottommost) location (e.g., the "Inverse Center" carrier shown in FIG. 11), a non-clamped intermediate duty cycle carrier is inserted to prevent discontinuities in the PWM carrier waveform. For example, where the prior PWM period's carrier ends in a high (or topmost) location (e.g., the "Center" carrier shown in FIG. 11), and where the desired ending location of the current PWM period's carrier is a low (or bottommost) location (e.g., the "Inverse Center" carrier shown in FIG. 11), a non-clamped intermediate duty cycle carrier (e.g., the "Inverse Edge" carrier shown in FIG. 11) is inserted to transition the carrier from its high (or topmost) location to its low (or bottommost) location, thereby avoiding discontinuities in the PWM carrier waveform. Similarly, if the prior PWM period's carrier ends in a low (or bottommost) location (e.g., the "Inverse Center" carrier shown in FIG. 11), and if the desired ending location of the current PWM period's carrier is a high (or topmost) location (e.g., the "Center" carrier shown in FIG. 11), a non-clamped intermediate duty cycle carrier is inserted to prevent discontinuities in the PWM carrier waveform. For example, where the prior PWM period's carrier ends in a low (or bottommost) location (e.g., the "Inverse Center" carrier shown in FIG. 11), and where the desired ending location of the current PWM period's carrier is a high (or topmost) location (e.g., the "Center" carrier shown in FIG. 11), a non-clamped intermediate duty cycle carrier (e.g., the "Edge" carrier shown in FIG. 11) is inserted to transition the carrier from its low (or bottommost) location to its high (or topmost) location, thereby avoiding discontinuities in the PWM carrier waveform.

At block 512, the method 500 applies the duty cycles $D_0$, $D_1$, $D_2$ computed at block 506 to each phase A, phase B, and phase C, according to Table III shown in FIGS. 12A, 12B. At block 514, the inverter controller 140 uses the computations at Table III to generate PWM voltages to control the inverter 120, 120A to generate an AC waveform with minimized switching losses (beyond what is available through traditional DPWM) and continuous carrier transitions that avoid malfunctions that would occur from switching carrier waveforms in less time than is required by the associated switching hardware. More specifically, as shown under the column "Duty Cycle X," the duty cycles $D_0$, $D_1$, $D_2$ are applied taking into account the hexagonal sector, the PWM-AM that results from the continuous carrier module 144 (shown in FIG. 1), and the results of the clamping state selection analysis performed by the clamping state selection module 142 (shown in FIG. 1).

FIG. 12C depicts Table IV, which is an example of a starting point for determining the duty cycles A, B, C shown under the column "Duty Cycle X" in FIGS. 12A and 12B in accordance with aspects of the disclosure. Table IV of FIGS. 12C and 11D shows CPWM calculation of Duty Cycle A, B, C using Equations (1)-(3) (shown in FIG. 7) based on the 6 different hexagon sectors. For DPWM, the strategy used to generate Table IV (shown in FIG. 12C) is modified as Table III (shown in FIGS. 12A, 12B) to be compatible with positive and negative rail clamping. Using sector zero (0) (Case 0) as an example, it can be observed from Table III that, when clamping to the negative rail is needed, Duty cycle C should be always zero (0) instead of $0.5*D_0$, Duty Cycle B=$D_2$+Duty Cycle C(0)=$D_2$, Duty Cycle A is still equal to Duty Cycle B+$D_1$. Similarly, when clamping to positive rail is needed, Duty Cycle A should be always 1 instead of Duty Cycle B+$D_1$, Duty Cycle B and C should be calculated from Duty Cycle A, then Duty Cycle B becomes Duty Cycle A(1)−$D_1$, and Duty Cycle C is Duty Cycle B−$D_2$. When a non-clamped intermediate duty cycle carrier (Edge and Inverse Edge) is inserted, as there is no clamping, the CPWM Duty Cycle calculation can still be used.

FIG. 13 illustrates an example of a computer system 1200 that can be used to implement the computer-based components in accordance with aspects of the disclosure. The computer system 1200 includes an exemplary computing device ("computer") 1202 configured for performing various aspects of the content-based semantic monitoring operations described herein in accordance aspects of the disclosure. In addition to computer 1202, exemplary computer system 1200 includes network 1214, which connects computer 1202 to additional systems (not depicted) and can include one or more wide area networks (WANs) and/or local area networks (LANs) such as the Internet, intranet(s), and/or wireless communication network(s). Computer 1202 and additional system are in communication via network 1214, e.g., to communicate data between them.

Exemplary computer 1202 includes processor cores 1204, main memory ("memory") 1210, and input/output component(s) 1212, which are in communication via bus 1203. Processor cores 1204 includes cache memory ("cache") 1206 and controls 1208, which include branch prediction structures and associated search, hit, detect and update logic, which will be described in more detail below. Cache 1206 can include multiple cache levels (not depicted) that are on or off-chip from processor 1204. Memory 1210 can include various data stored therein, e.g., instructions, software, routines, etc., which, e.g., can be transferred to/from cache 1206 by controls 1208 for execution by processor 1204. Input/output component(s) 1212 can include one or more components that facilitate local and/or remote input/output operations to/from computer 1202, such as a display, keyboard, modem, network adapter, etc. (not depicted).

A cloud computing system 50 is in wired or wireless electronic communication with the computer system 1200. The cloud computing system 50 can supplement, support or replace some or all of the functionality (in any combination) of the computer system 1200. Additionally, some or all of the functionality of the computer system 1200 can be implemented as a node of the cloud computing system 50.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An inverter controller configured to control an inverter, comprising:
- a microprocessor that is configured to measure or estimate a temperature of a first phase and to measure or estimate a temperature of a second phase; determine whether the temperature of the first phase is greater than the second phase; and select a switch in the inverter to clamp based on the determination; and
- an inverter electrically coupled to the inverter controller and an energy source.

2. The inverter controller recited in claim 1, wherein the microprocessor is configured to calculate a duty cycle.

3. The inverter controller recited in claim 1, wherein the microprocessor is configured to determine a pulse width modulation alignment mode.

4. The inverter controller recited in claim 1, wherein the microprocessor is configured to determine whether the temperature of the first phase is equal to the second phase and maintain an existing clamp based on the determination.

5. The inverter controller recited in claim 1, wherein the switch in the inverter to clamp is selected to reduce thermal stress on the inverter.

6. An inverter controller configured to control an inverter, comprising:
- a microprocessor that is configured to select one of six hexagon sectors for discontinuous pulse width modulation; measure or estimate a temperature of a first phase and to measure or estimate a temperature of a second phase; determine whether the temperature of the first phase is greater than the second phase; and select a switch in the inverter to clamp based on whether the temperature of the first phase is greater than the second phase, and the selected sector.

7. The inverter controller recited in claim 6 further comprising an inverter electrically coupled to the inverter controller and an energy source.

8. The inverter controller recited in claim 6, wherein the microprocessor is configured to calculate a duty cycle.

9. The inverter controller recited in claim 6, wherein the microprocessor is configured to determine a pulse width modulation alignment mode.

10. The inverter controller recited in claim 6, wherein the microprocessor is configured to determine whether the temperature of the first phase is equal to the second phase and maintain an existing clamp based on the determination.

11. The inverter controller recited in claim 6, wherein the switch in the inverter to clamp is selected to reduce thermal stress on the inverter.

12. A method of controlling an inverter coupled to an inverter controller and an energy source, comprising the steps of:
- (a) measuring or estimating a temperature of a first phase;
- (b) measuring or estimating a temperature of a second phase;
- (c) determining whether the temperature of the first phase is greater than the second phase; and
- (d) selecting a switch in the inverter to clamp based on the determination in step (c).

13. The method recited in claim 12, further comprising the step of calculating a duty cycle.

14. The method recited in claim 12, further comprising the step of determining a pulse width modulation alignment mode.

15. The method recited in claim 12, further comprising the step of determining whether the temperature of the first phase is equal to the second phase and maintaining an existing clamp based on the determination.

16. The method recited in claim 12, further comprising the step of clamping the switch in the inverter to reduce thermal stress on the inverter.

* * * * *